United States Patent
Kalhan et al.

(10) Patent No.: US 7,085,571 B2
(45) Date of Patent: Aug. 1, 2006

(54) SYSTEM AND METHOD FOR USING GEOGRAPHICAL LOCATION TO DETERMINE WHEN TO EXIT AN EXISTING WIRELESS COMMUNICATIONS COVERAGE NETWORK

(75) Inventors: Amit Kalhan, San Diego, CA (US); Henry Chang, San Diego, CA (US)

(73) Assignee: Kyocera Wireless Corp., San Diego, CA (US)

( * ) Notice: Subject to any disclaimer, the term of this patent is extended or adjusted under 35 U.S.C. 154(b) by 128 days.

(21) Appl. No.: 10/649,011

(22) Filed: Aug. 26, 2003

(65) Prior Publication Data

US 2005/0048976 A1 Mar. 3, 2005

(51) Int. Cl.
*H04Q 7/20* (2006.01)

(52) U.S. Cl. .................. 455/440; 455/436; 455/456.3; 455/439; 455/456.1

(58) Field of Classification Search ............. 455/404.2, 455/435.1, 436, 440, 450, 456.1, 456.3, 457; 370/328, 329, 330, 331, 333
See application file for complete search history.

(56) References Cited

U.S. PATENT DOCUMENTS

| 5,669,061 | A | | 9/1997 | Schipper | |
|---|---|---|---|---|---|
| 6,125,278 | A | * | 9/2000 | Wieczorek et al. | 455/437 |
| 6,631,263 | B1 | * | 10/2003 | Corkery | 455/436 |
| 6,714,789 | B1 | * | 3/2004 | Oh et al. | 455/456.1 |
| 6,810,325 | B1 | * | 10/2004 | Amano et al. | 701/207 |
| 2004/0198254 | A1 | * | 10/2004 | Mizui et al. | 455/99 |
| 2004/0203831 | A1 | * | 10/2004 | Khan | 455/452.2 |

FOREIGN PATENT DOCUMENTS

| DE | 3508900 A1 | 9/1986 |
|---|---|---|
| EP | 0966173 A1 | 12/1999 |
| EP | 1225782 A1 | 7/2002 |

* cited by examiner

*Primary Examiner*—Eliseo Ramos Feliciano
*Assistant Examiner*—Dai Phuong (57) ABSTRACT

A system and method are presented for determining when to exit an existing wireless communications coverage network. The method samples the device geographical position, determines a threshold boundary line, measures the position of each sample point with respect to the threshold boundary line, and, beginning at a predetermined initial value, maintains a running sum in response to measuring position. The method uses the threshold boundary line to partition a coverage area for the existing coverage network into first and second zones. Then, the method decrements the running sum for sample point positions in the first zone and increments the running sum sample point positions in the second zone. The method exits the existing coverage network when the running sum is greater than or equal to a predetermined terminal value and then resets the running sum to the predetermined initial value.

24 Claims, 4 Drawing Sheets

| DEVICE POSITION | RUNNING TOTAL |
|---|---|
| A | 0 |
| B | 1 |
| C | 0 |
| D | 1 |
| E | 2 |
| F | 5 |
| G | 10 |
| H | 13/0 ← RESET/EXIT |
| I | 0 |

SYSTEM AND METHOD FOR USING GEOGRAPHICAL LOCATION TO DETERMINE WHEN TO EXIT AN EXISTING WIRELESS COMMUNICATIONS COVERAGE NETWORK

BACKGROUND OF THE INVENTION

1. Field of the Invention

This invention relates generally to wireless communications devices and, more particularly, to a system and method for a wireless communications device communicating with base stations to determine whether it should stay with an existing wireless communications coverage network.

2. Description of the Related Art

A key concern for the operation of wireless communications devices is the acquisition of a coverage network with the highest probability of providing a good grade of service. The following discussion uses Code Division Multiple Access (CDMA) networks as an example, however, it should be understood that the discussion applies to other wireless communications networks. As a CDMA device approaches an edge of a CDMA coverage cell, the device begins operating at the limit of forward and/or reverse link budget of the CDMA network and a decision is required regarding an exit from the current cell. It is important to make an accurate determination of when to leave the current cell, as there are penalties associated with both premature and late exits from an existing wireless communications coverage network, hereafter referred to as an existing coverage network. Premature exit entails the unnecessary loss of the preferred coverage system and may entail the acquisition of an analog coverage network with attendant degradation of battery performance. Late exit may entail missing pages or dropping calls on origination due to reverse-link limitations.

It is known to allow wireless communications devices to remain on the existing coverage until complete loss of the paging channel. This approach typically results in late exits. It also is known to initiate the exit process when the device reaches a predetermined location. To implement this approach, a threshold boundary line or boundary zone at a predetermined distance from the base station is established by the base station (BS) or mobile switching center (MSC) for the coverage network providing service to the device. Typically, the BS also determines the location of the device. When the device moves past the threshold line or into the threshold zone, the device exits the existing coverage network.

Figure 6:
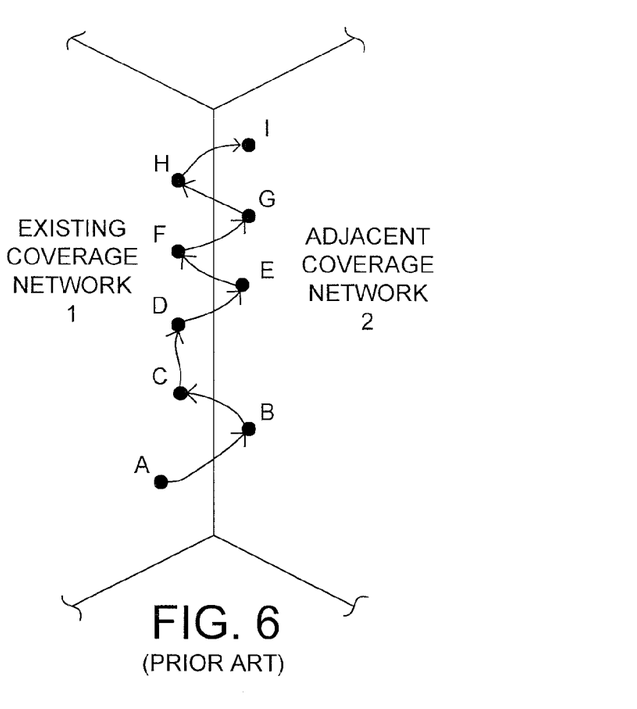
FIG. 6 is a pictorial representation showing the path of a wireless device through an existing coverage network and an adjacent coverage network (prior art).

FIG. 6 is a pictorial representation showing the path of a wireless device through an existing coverage network and an adjacent coverage network (prior art). Unfortunately, the threshold boundary line/zone approach described above may result in premature exits from the existing coverage network. That is, a momentary excursion across the threshold line can cause the wireless communications device to exit the existing coverage area even when the device quickly returns to and stays in the original coverage network. For example, in FIG. 6, the device exits network 1 and acquires network 2 when moving from point A to B, but shortly thereafter, exits network 2 and re-acquires network 1 when moving from point B to C and then on to point D. Unfortunately, during each transition between coverage networks, data transmission can be impaired and extra battery power is consumed. In addition, each time the device switches from demodulating one Air-Interface to another as a result of the transition, the device also must reconfigure its resources to accommodate the new Air-Interface. The problem is exacerbated if the device ping-pongs, or oscillates, between coverage networks as a result of a series of rapid excursions across the threshold boundary line, for example, moving through points D to I in FIG. 6.

In a CDMA cell, the area of satisfactory operation (the aerial extent of the coverage area), and hence, the location of appropriate threshold boundary lines, is dependent upon the traffic within the cell. Due to inter-cell and intra-cell interferences, the base station noise floor may appear to rise as the traffic load within the cell increases. As a result, wireless devices in the cell must transmit additional power to overcome the increased interferences, effectively shrinking the cell. Shrinking the cell can move the area suitable for coverage network handoff closer to the center of the cell. Unfortunately, threshold locations are typically fixed and cannot adapt to location changes to the area suitable for coverage network.

It would be advantageous if a wireless communications device operating near a cell edge for an existing coverage network could accurately determine when to exit the existing coverage network so as to avoid premature or late exits.

It would be advantageous if a wireless communications device operating near a cell edge for an existing coverage network could accurately determine when to exit the existing coverage network so as to avoid oscillating between the existing and adjacent coverage networks.

It would be advantageous if a wireless communications device operating near a cell edge for an existing CDMA coverage network could dynamically modify parameters, based on actual conditions in the network, for determining when to exit the CDMA coverage network.

SUMMARY OF THE INVENTION

The present invention was created to address the problem of determining when a wireless communications device operating near a cell edge for an existing coverage network should exit the existing coverage network. The invention recognizes that analysis of the wireless communications device distance from a base station can be used to determine this exit. The invention addresses this requirement by compiling a history of geographical location data for the wireless communications device, and in response to the history of device geographical location data, exiting the existing coverage network.

Accordingly, a method is provided for determining when to exit an existing wireless communications coverage network. The method samples the device geographical position, determines a threshold boundary line, measures the position of each sample point with respect to the threshold boundary line, and, beginning at a predetermined initial value, maintains a running sum in response to measuring position. The method uses the threshold boundary line to partition a coverage area for the existing coverage network into first and second zones. Then, the method decrements the running sum for sample point positions in the first zone and increments the running sum for sample point positions in the second zone. The method exits the existing coverage network when the running sum is greater than or equal to a predetermined terminal value and then resets the running sum to the predetermined initial value.

Additional details of the above-described method, and a system for determining when to exit an existing wireless communications coverage network are provided below.

DETAILED DESCRIPTION OF THE PREFERRED EMBODIMENTS

Figure 1:
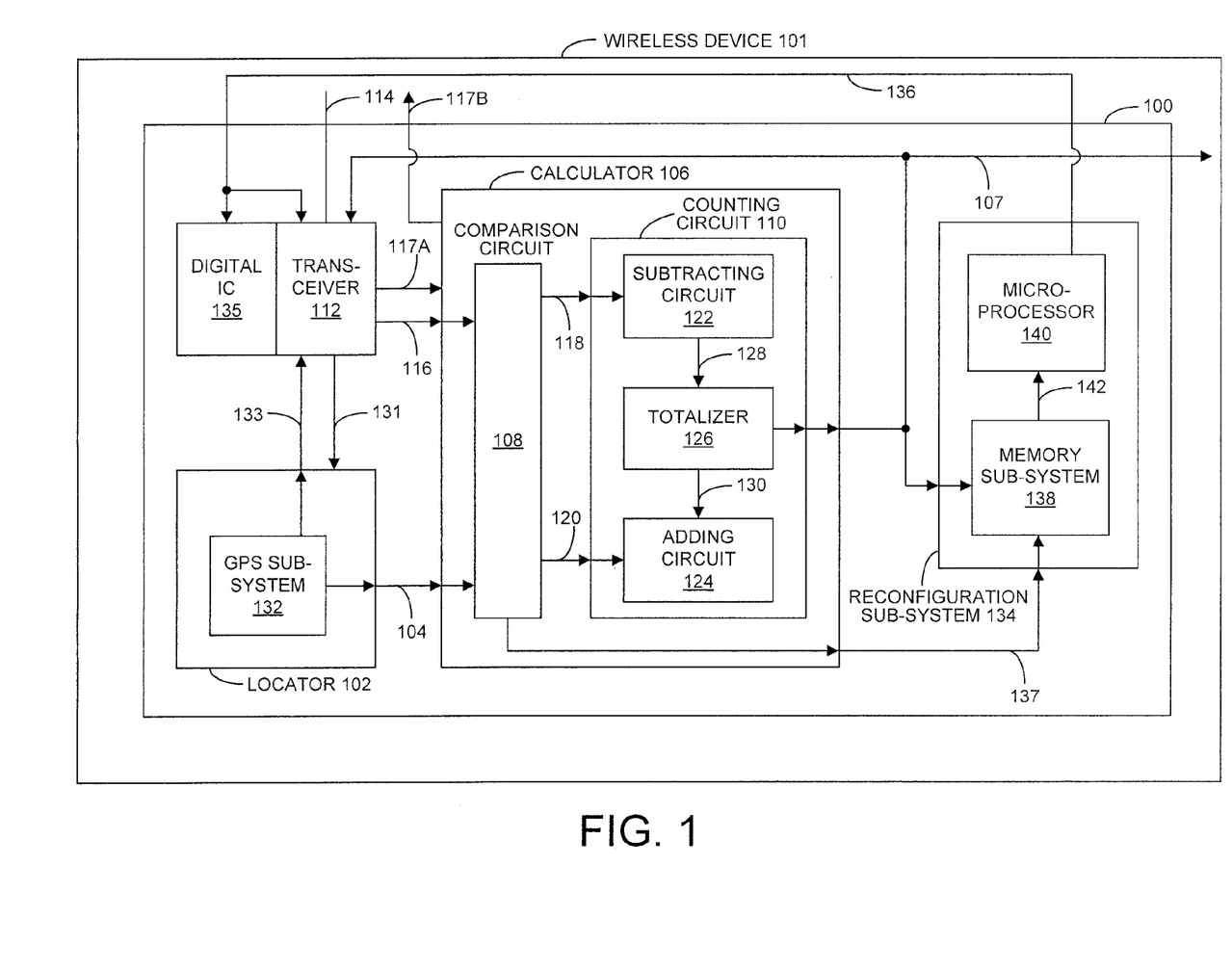
FIG. 1 is a schematic block diagram depicting a system for determining when to exit an existing wireless communications coverage network.

FIG. 1 is a schematic block diagram depicting a system 100 for determining when to exit an existing wireless communications coverage network. The system 100 in wireless device 101 includes a locator 102 with an output on line 104 to supply device geographical sample positions and a calculator 106 with an input connected to line 104. The calculator 106 can be implemented in software or hardware. In some aspects, the locator 102 output on line 104 supplies device geographical sample positions periodically. The calculator 106 has an output on line 107 to supply an exit control signal responsive to a history of device geographical sample positions and a first threshold boundary line.

The calculator 106 includes a comparison circuit 108 and a counting circuit 110. The comparison circuit 108 includes an input connected to the calculator 106 input on line 104. The comparison circuit 108 selects the threshold boundary line and measures the difference between each device geographical sample position and the first threshold boundary line in response to accepting device geographical sample positions. In some aspects, the comparison circuit 108 uses a look-up table (LUT) (not shown) in comparison circuit 108 to obtain information to select the threshold boundary line. In some aspects, the system 100 includes a transceiver 112 with an antenna port on line 114 to accept threshold boundary line information transmitted from a base station (not shown) and an output on line 116 to supply the threshold boundary line information. In this aspect, the calculator 106 has an input on line 116 and the comparison circuit 108 has an input connected to the calculator 106 input on line 116. The comparison circuit 108 uses the information accepted on line 116 to select the threshold boundary line. In some aspects, the comparison circuit 108 stores the information from the base station in the LUT noted above.

In some aspects, the device 101 initiates an exit from the existing network in response to the exit control signal on line 107. In some aspects, the device 101 initiates an exit from the existing network in response to a command from a base station (not shown). In these aspects, the transceiver 112 includes an input connected to the calculator 106 output on line 107 and an output on line 117A; and the calculator 106 includes an input on line 117A and an output on line 117B.

In response to accepting the exit control signal on line 107, the transceiver 112 antenna port on line 114 sends a signal for a base station (not shown) for the current coverage network. Then, the base station determines if the device 101 should exit the existing coverage network. If a decision is made to exit the existing coverage network, the base station supplies a command signal to the transceiver 112 on line 114. The transceiver 112 output on line 117A supplies the command signal and, in response to the calculator 106 accepting the command signal on line 117A, the calculator 106 output on line 117B supplies a base station exit signal. The device 101 exits the existing coverage network in response to the base station exit signal on line 117B.

The comparison circuit 108 includes outputs on lines 118 and 120, respectively, to supply decrement and increment control signals, respectively, in response to the comparison. The counter circuit 110 includes inputs on lines 118 and 120, respectively, performs mathematical functions responsive to accepting the decrement and increment control signals, and compares the results of the mathematic functions to a predetermined terminal value. The counter circuit 110 includes an output connected to the calculator 106 output on line 107 to supply the exit control signal in response to the comparison.

Figure 2:
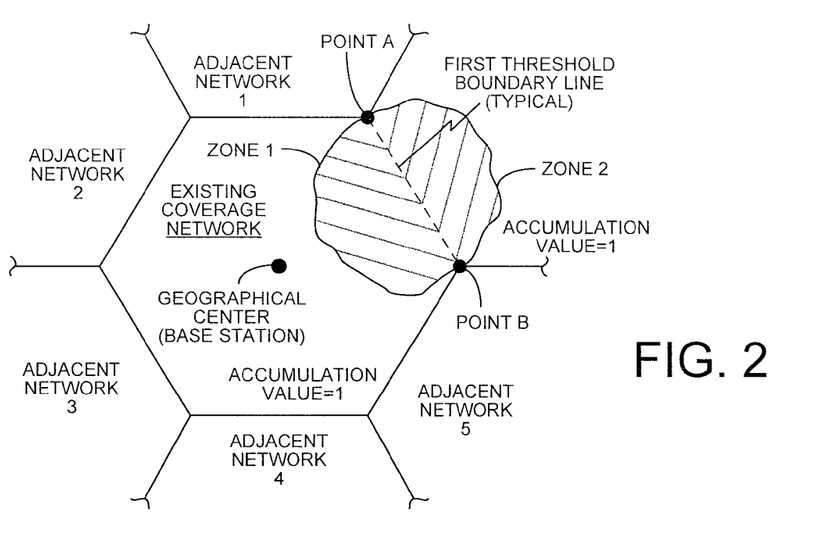
FIG. 2 is a pictorial representation depicting a first threshold boundary line and first and second zones between an existing coverage network and an adjacent coverage network.

FIG. 2 is a pictorial representation depicting a first threshold boundary line and first and second zones between an existing coverage network and an adjacent coverage network. FIG. 2 is not drawn to scale. The distance of a wireless device from a threshold boundary line between an existing coverage network area and an adjoining coverage network area can be applied to the exit problem. Although straight-line threshold boundary lines are shown in FIG. 2, it should be understood that other configurations, such as a circular threshold boundary line, also are applicable. The distance of the threshold boundary line from the base station can be selected according to the desired performance of the system. One possible distance is the maximum distance from the base station associated with the limit of forward and/or reverse link budget. That is, device geographical sample positions further from the base station than the threshold line indicate a trend toward unsatisfactory operation, and positions between the threshold line and the base station indicate a trend toward satisfactory operation. The device should exit if it is consistently located beyond the threshold boundary line.

The comparison circuit (reference designator 108 in FIG. 1) selects a threshold boundary line to partition, into first and second zones, an area including at least a portion of a coverage area for the existing coverage network and at least a portion of a coverage area for a second coverage network proximate the existing coverage network, as shown in FIG. 2. The first zone is located between the boundary line and the geographical center of the existing coverage network. That is, the first zone is generally the area of satisfactory operation. The second zone is generally the area of unsatisfactory operation (with respect to the existing coverage network). The extent and limits of the first and second zones can be varied in response to desired system performance, as described below.

The compilation of historical data regarding the device geographical sample positions allows an identification of the longer-term trends associated with device geographical sample positions, such as consistent positioning on one side or the other of the threshold boundary line. These trends are more accurate indicators of the quality of the coverage for the wireless communications device.

Returning to FIG. 1, the comparison circuit 108 output on line 118 supplies a first decrement control signal in response to accepting a device geographical sample position in the first zone and the comparison circuit 108 output on line 120 supplies a first increment control signal in response to accepting a device geographical sample position in the second zone. In some aspects, the counting circuit 110 includes a subtracting circuit 122, an adding circuit 124, and a totalizer 126. The subtracting circuit 122 includes an input connected to the counting circuit input on line 118 and an output on line 128 supplying a first predetermined accumulation value in response to accepting the first decrement control signal. The adding circuit 124 includes an input connected to the counting circuit input on line 120 and an output on line 130 supplying a second predetermined accumulation value in response to accepting the first increment control signal.

The totalizer 126 has inputs connected to lines 128 and 130, respectively and an output connected to the counting circuit output on line 107. The totalizer 126 accepts the first and second accumulation values and uses the accumulation values to maintain the running total starting at a predetermined initial value. The totalizer 126 decrements the running total for each first accumulation value, increments the running total for each second accumulation value, and compares the running total to the terminal value. The totalizer 126 output supplies the exit control signal when the running total is greater than, or equal, to the terminal value and resets the running total to the initial value after supplying the exit control signal.

The terminal value can be selected according to the desired performance of the system. However, the terminal value should be coordinated with the accumulation values. That is, the terminal value should be high enough that a series of second accumulation values (from device geographical sample positions in the second zone), not indicative of consistent positioning in the second zone, does not cause the running total to equal or exceed the terminal value. In a similar manner, the terminal value should be low enough that a longer series of second accumulation values, indicating consistent positioning in the second zone, does cause the running total to equal or exceed the terminal value.

One issue associated with compiling historical data on the device geographical sample positions is the biasing of the running total with device geographical sample positions in the first zone. Potential biasing of the running total is an issue because the running total must be able to respond (approach the terminal value) if the wireless communications device operates for a sufficient period of time in the second zone. This may not be possible if the wireless communications device has previously been operating for a period of time in the first zone with the result that a large number of first accumulation values cause the running total to move too far below the terminal value.

To avoid biasing, the totalizer 126 decrements the running total for each first accumulation value only if the running total is greater than a predetermined minimum total value. Otherwise, the running count is maintained at the minimum total value until a second accumulation value is encountered. As with the threshold boundary line and the terminal value, the minimum total value can be selected according to the desired performance of the system and is coordinated with these other values.

The assignment of values for the first and second accumulation values can be selected according to the desired performance of the system. The accumulation values also are coordinated with the threshold boundary line, the terminal value, and the minimum total value. In one aspect, the absolute value of the first accumulation value equals the absolute value of the second accumulation value. That is, device positions in the first and second zones are given equal weight in the analysis of when to exit the existing coverage area.

Returning to FIG. 2, the absolute values of the accumulation values in the first and second zones are shown as being "1". Alternately, unequal weight can be assigned to the accumulation values to bias the operation of system 100 toward exiting or staying in the existing coverage network. For example, assigning more weight to device geographical sample positions in the second zone would result in a quicker exit from the existing coverage network, since the larger second accumulation values would more rapidly increment the running total to the terminal value.

Figure 3A:
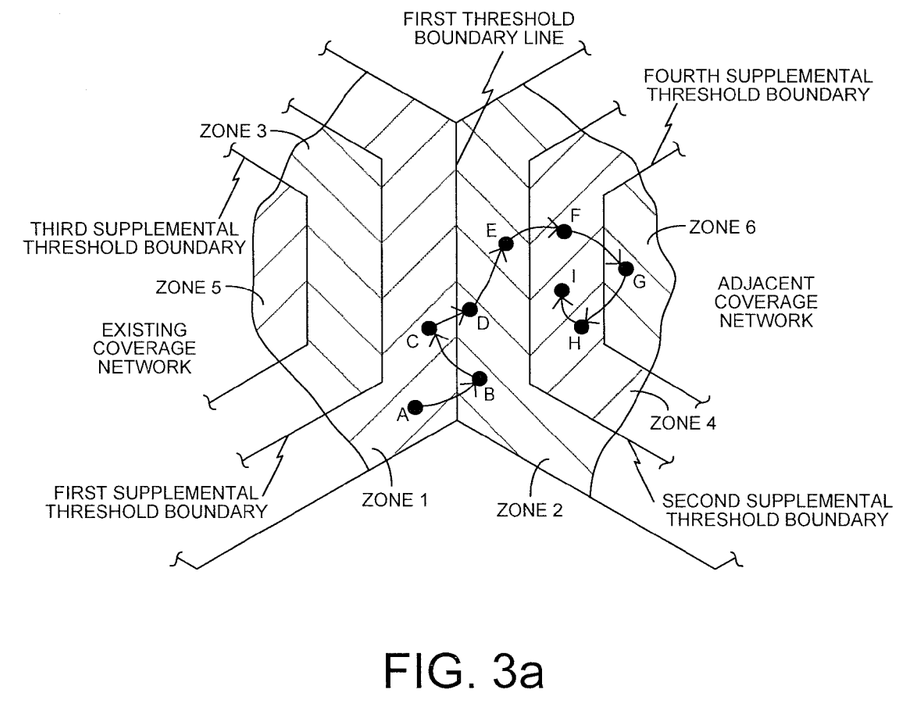
FIG. 3a is a pictorial representation depicting multiple thresholds and zones between an existing coverage network and an adjacent coverage network.

FIG. 3a is a pictorial representation depicting multiple thresholds and zones between an existing coverage network and an adjacent coverage network. FIG. 3a is not drawn to scale. The simplicity of the system 100 described in FIG. 2 is offset by limitations. Assigning the same accumulation value for all points within the first or second zones does not account for the variation of satisfactory device operation within a zone and thus cannot account for positional trends within a zone. For example, in the first zone, the system does not differentiate between device positions relatively close to the base station (indicative of satisfactory device operation) and device positions relatively close to the threshold boundary line (indicative of less satisfactory device operation). Therefore, in some aspects, predetermined supplemental threshold boundary lines, defining additional zones, are included to increase the accuracy and responsiveness of the system. The first supplemental threshold boundary line defines the first and second zones shown in FIG. 3a. The second supplemental threshold boundary line defines the third and fourth zones shown in FIG. 3a. Supplemental thresholds allow the system to identify device geographical sample positions associated with a higher certainty of operation in areas with significantly better or worse coverage. The supplemental threshold boundary lines shown in FIG. 3a are parallel to the first threshold boundary line and are the same type of boundary line (straight-line) as the first threshold boundary line. However, it is understood that the system 100 is not limited to like line types for the first threshold boundary line and supplemental boundary lines or to parallel configurations of the first threshold boundary line and supplemental boundary lines.

Therefore, returning to FIG. 1, the comparison circuit 108 locates device geographical sample positions within the first through fourth zones. The comparison circuit 108 then supplies: the first decrement control signal for each device geographical sample position in the first zone; a second decrement control signal for each device geographical sample position in the third zone; the first increment control signal for each device geographical sample position in the second zone; and a second increment control signal for each device geographical sample position in the fourth zone.

The subtracting circuit 122 accepts the first and second decrement control signals on line 118, supplies the first accumulation value in response to the first decrement control signal, and supplies a third predetermined accumulation value in response to the second decrement control signal. Both accumulation values are supplied on line 128.

The adding circuit 124 accepts the first and second increment control signals on line 120, supplies the second accumulation value in response to the first increment control signal, and supplies a fourth predetermined accumulation value in response to the second increment control signal. Both accumulation values are supplied on line 130.

The totalizer 126 accepts the first, second, third, and fourth accumulation values, decrements the running total for each first and third accumulation value, and increments the running total for each second and fourth accumulation value. The totalizer 126 decrements the running total for each first and third accumulation value only if the running total is greater than the minimum total value.

The third and fourth accumulation values are larger than the first and second accumulation values, respectively to reflect the greater certainty associated with the third and fourth zones. Therefore, the running total moves more quickly toward or away from the terminal value in response to these accumulation values.

Returning to FIG. 3a, the selection of the supplemental threshold boundary lines and associated accumulation values can have a significant impact on the determination of when to exit the existing coverage area. In one aspect of the system 100, the first and second supplemental threshold boundary lines are equidistant from the first threshold boundary line, as shown in FIG. 3a. Then, in one aspect, the absolute value of the third accumulation value equals the absolute value of the fourth accumulation value. This results in an equal weighting of device geographical sample positions in the third and fourth zones. In FIG. 3a, the third and fourth accumulation values are "3". Alternately, when the first and second supplemental threshold boundary lines are equidistant from the first threshold boundary line, unequal weight can be assigned to the accumulation values to bias the operation of system 100 toward exiting or staying in the existing coverage network. For example, assigning more weight to values in the fourth zone would result in a quicker exit from the existing coverage network, since the larger fourth accumulation values would more rapidly increment the running total to the terminal value.

In some aspects (not shown), the first and second supplemental threshold boundary lines are not equidistant from the first threshold boundary line. For example, the first supplemental boundary line is further from the first threshold boundary line than the second supplemental threshold boundary line is from the first threshold boundary. If the third and fourth accumulation values are equal, then less weight will be given to device geographical sample positions in areas of better coverage (the third zone). Alternately, as described above, the operation of system 100 can be further biased toward exiting or staying in the existing coverage network by assigning unequal third and fourth accumulation values.

Additional supplemental threshold boundary lines can be added to the system 100 to further fine tune the system. For example, as shown in FIG. 3a, a third supplemental threshold boundary line can be added to define a fifth zone proximate the third zone. Also as shown in FIG. 3a, a fourth supplemental threshold boundary line can be added to define a sixth zone proximate the fourth zone.

Returning to FIG. 1, for device geographical sample positions in the fifth and sixth zones: the comparison circuit 108 supplies third decrement and increment control signals, respectively; the subtraction circuit 122 and the addition circuit 124 supply fifth and sixth accumulation values, respectively; and the totalizer 126 decrements and increments the running total responsive to the fifth and sixth accumulation values and supplies the exit signal as described above. In general, the fifth and sixth accumulation values are greater than the third and fourth accumulation values to reflect the greater certainty associated with the fifth and sixth zones. In FIG. 3a, the absolute value of the fifth and sixth accumulation values are equal at "5". In some aspects, the third and fourth supplemental threshold boundary lines are equidistant from the first threshold boundary line. However, the preceding discussions for FIG. 3a regarding the selection of accumulation values and supplemental threshold boundary locations apply to this example also, hence, other combinations of accumulation values and supplemental threshold distances from the first threshold boundary line are possible. It should be understood that the system 100 is not limited to any particular number of thresholds or zones and that additional supplemental threshold boundary lines and zones can be added.

In some aspects, the number of supplemental threshold boundary lines on either side of the first threshold boundary line may not be equal (not shown). For example, only the first supplemental threshold boundary line could be included. This would result in a slower exit from the existing coverage network, since the larger accumulation values associated with the first supplemental threshold boundary line would more rapidly decrement the running total away from the terminal value. However, the preceding discussions for FIG. 3a regarding the selection of accumulation values and threshold boundary locations apply to this example also, hence, other combinations and results are possible.

Figure 3B:
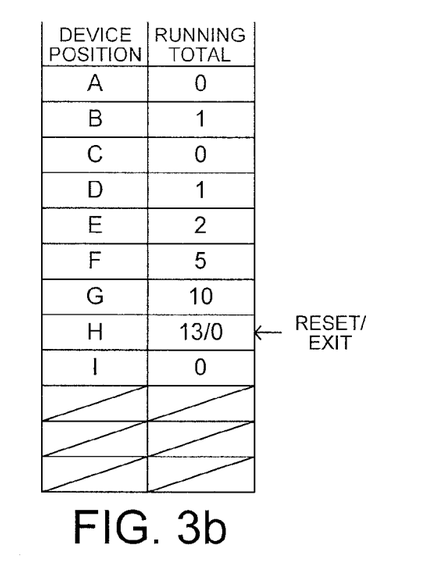
FIG. 3b is a chart listing device positions shown in FIG. 3a and corresponding adjustments of a running total.

FIG. 3b is a chart listing device positions shown in FIG. 3a and corresponding adjustments of a running total. Returning to FIG. 3a, a series of successive device geographical sample positions (A through I) are shown to illustrate the operation of the system 100. FIG. 3b assumes a minimum total value of zero, a terminal value of 12, and a running total of zero at point A. As shown in FIG. 3b, the running total exceeds the terminal value at position H, at which time, the totalizer (reference indicator 126 in FIG. 1) issues an exit signal. At point H, the device exits the existing coverage network and acquires the adjacent coverage network. At that time, the former adjacent coverage network becomes the existing coverage network within the context of system 100. For example, device geographical sample positions in the second, fourth, and sixth zones now cause the comparison circuit (reference designator 108 in FIG. 1) to supply decrement control signals and geographical sample positions in the first, third, and fifth zones now cause the comparison circuit (reference designator 108 in FIG. 1) to supply increment control signals. Thus, as shown in FIG. 3b, the running total remains at the minimum total value of zero when moving from point H to point I.

Returning to FIG. 1, in some aspects, the device geographical sample positions supplied by the locator 102 on line 104 are calculated by the locator 102. In some aspects, the transceiver 112 port on line 114 accepts device geographical sample positions calculated by an external site (not shown), such as a base station. A transceiver 112 output on line 131 supplies the positions to a locator 102 input. The locator 102 supplies the positions on line 104.

Information supplied by the device 101 can be used to calculate device geographical sample positions whether the calculations are performed by the locator 102 or by an external source. One approach to supplying information is pseudo-ranging using Global Positioning System (GPS) information. Therefore, in some aspects, the locator 102 includes a GPS sub-system 132. The GPS sub-system 132 receives GPS position information for the wireless device 101 from GPS satellites (not shown). For aspects in which the locator 102 calculates the positions, a GPS sub-system 132 output is connected to the locator 102 output on line 104. For aspects in which an external site calculates the positions, a GPS sub-system 132 output on line 133 is connected to a locator 102 output that is connected to a transceiver 112 input. The GPS sub-system 132 output on line 133 supplies pseudo-range information. The transceiver 112 antenna port on line 114 supplies the pseudo-range information for transmission to the external site.

Another approach to supplying information is network-triangulation, for example, Advanced Forward Link Trilateration (AFLT). For this approach, the device 101 generates information regarding device position using propagation delays from three different base stations (not shown). The generation of this information is not shown in FIG. 1. For aspects in which the locator 102 calculates the positions, the locator 102 uses the network-triangulation information to calculate device geographical sample positions and supplies the positions on line 104. For aspects in which an external site calculates the positions, the transceiver 112 antenna port on line 114 supplies the network-triangulation information for transmission to the external site.

In some aspects, the system 100 uses a combination of pseudo-ranging and network-triangulation to obtain information regarding device geographical sample positions.

In some aspects, the system 100 includes a reconfiguration sub-system 134 and a digital integrated circuit 135. The reconfiguration sub-system 134 includes system processors for coverage networks such as Code Division Multiple Access (CDMA), Time Division Multiple Access (TDMA), and Global System for Mobile Communications (GSM). The reconfiguration sub-system 134 has an input connected to line 107 and an output on line 136 connected to a digital IC input and to a transceiver 112 input. In response to accepting the exit control signal on line 107, the reconfiguration sub-system 134 modifies the system processor operating on the existing coverage network to operate on a second coverage network, the second network adjacent to the existing coverage network along the first threshold boundary line. The reconfiguration sub-system output on line 136 supplies reconfiguration information and instructions for the second network. In response to accepting the information and instructions on line 136, the transceiver 112 and the digital IC 135 reconfigure for the second network.

The calculator 106 has an output on line 137 and the comparison circuit 108 has an output connected to the calculator 106 output on line 137. In response to determining threshold boundary lines, the comparison circuit 108 output on line 137 supplies information regarding the second coverage network. The reconfiguration sub-system 134 has an input connected to the calculator 106 output on line 137 and, in response to an input, prepares the reconfiguration sub-system 134 to modify the processor for the existing network to operate on the second coverage network.

In some aspects, the reconfiguration sub-system 134 includes a memory sub-system 138 to store operating system processor software for coverage networks, such as CDMA, TDMA, and GSM, and a microprocessor 140. The memory sub-system 138 has an input connected to the reconfiguration sub-system 134 output on line 137 and, in response to an input, pre-selects operating system processor software corresponding to the coverage network identified in the input on line 137. The memory circuit 138 has an input connected to the reconfiguration sub-system 134 input on line 107 and an output on line 142. In response to receiving an exit signal on line 107, the memory sub-system 138 output supplies the pre-selected operating system processor software on line 142. The microprocessor 140 has an input on line 142 and, in response to accepting an input on line 142, downloads the pre-selected operating system processor software to replace operating system processor software for the existing coverage network. The microprocessor 140 has an output connected to the reconfiguration sub-system 134 output on line 136. In response to downloading the pre-selected operating system processor software, the microprocessor 140 output supplies the reconfiguration information and instructions for the second network.

In some aspects, the system 100 includes multiple transceivers and digital IC combinations (not shown) to support, respectively, coverage networks such as CDMA, TDMA, and GSM. In these aspects, the calculator 106 has outputs (not shown) connected to the respective transceiver and digital IC combinations and, in response to the totalizer 126 supplying the exit signal, the appropriate calculator 106 outputs supply signals, respectively, to deactivate the transceiver and digital IC for the existing network and to activate the transceiver and digital IC for the second network.

In some aspects, the comparison circuit 108 forms threshold boundary lines using vectors referenced to the geographical center of the existing coverage network. The vectors can be stored in a memory sub-system (not shown) in comparison circuit 108, or can be supplied from the base station (not shown) via the transceiver 112 output on line 116. Returning to FIG. 2, in some aspects, the vectors can be two geographical points (points A and B) defining the ends of a straight-line threshold boundary line. In some aspects, the vector can be a radius (not shown) and a circular threshold boundary line (not shown) is formed with a radius equal to the vector length.

As described above, a threshold boundary line is typically formed at the boundary of satisfactory operation within an existing coverage network. However, the boundary of satisfactory operation is sensitive to changes in environmental conditions and/or status of network operations, for example, loss of network signals. For some operating system, for example, TDMA, this boundary is relatively stable. However, in a CDMA cell, the area of satisfactory operation (the aerial extent of the coverage area) is dependent upon the traffic load within the cell, as described in the Background Section. Returning to FIG. 1, therefore, in some aspects, the transceiver 112 antenna port on line 114 receives information from an existing network base station (not shown) regarding dynamic conditions in the network cell. The transceiver 112 output on line 116 supplies the dynamic conditions information and in response to accepting the information on line 116, the comparison circuit 108 adapts threshold boundary lines to the dynamic conditions. In some aspects, the transceiver 112 antenna port on line 114 receives information from an existing CDMA network base station. Then, for example, adaptation of the threshold boundary lines by the comparison circuit 108 can include moving a threshold boundary line closer to a base station in response to changes in cell size caused by a traffic load increase within the cell.

In some aspects, the system 100 can be used to obtain information regarding coverage areas for other wireless communications coverage networks within, overlapping and proximate the existing wireless communications coverage network. This can be useful when the wireless device is operating in areas for which the base station or the system 100 does not already have threshold boundary line information. In particular, the location and coverage areas for intermittently operating systems, such as 802.11 systems, can be obtained and stored for future reference. In some aspects, the system 100 prompts the device 101 user (prompting components not shown) when the device 101 enters a known 802.11 coverage area and provides the user the opportunity to switch the device 101 from the existing coverage network to the 802.11 coverage network (switching components not shown). Once inside the 802.11 coverage area, an exit from the existing coverage using threshold boundary lines and zones, as described above, can be implemented.

Figure 4:
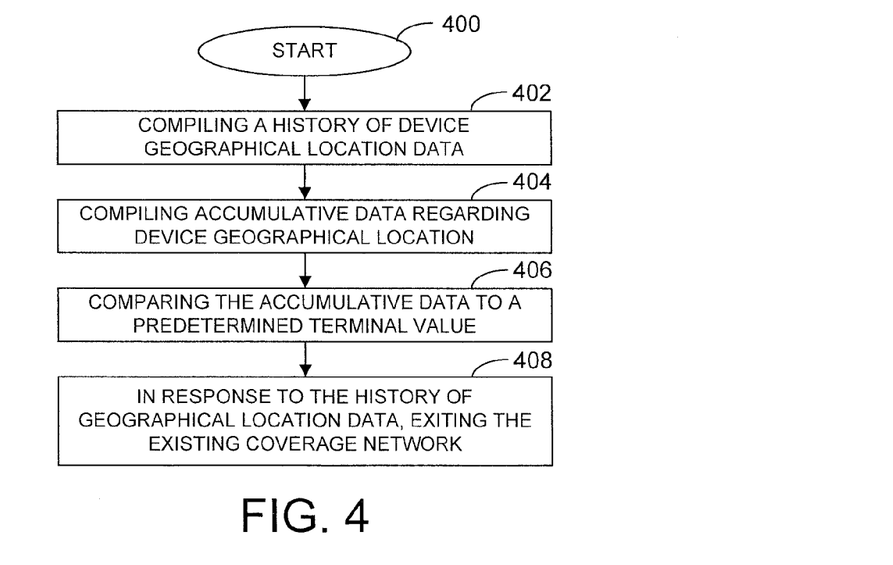
FIG. 4 is a flow chart illustrating a method for determining when to exit an existing wireless communications coverage network.

FIG. 4 is a flow chart illustrating a method for determining when to exit an existing wireless communications coverage network. Although the method in FIG. 4 (and FIG. 5 below) is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts with Step 400. Step 402 compiles a history of device geographical location data. Step 404 compiles accumulative data regarding device geographical location. Step 406 compares the accumulative data to a predetermined terminal value. Step 408 in response to the history of geographical location data, exits the existing coverage network. In some aspects, exiting the existing coverage network in Step 408 includes exiting in response to a command from the base station for the existing coverage network.

Figure 5:
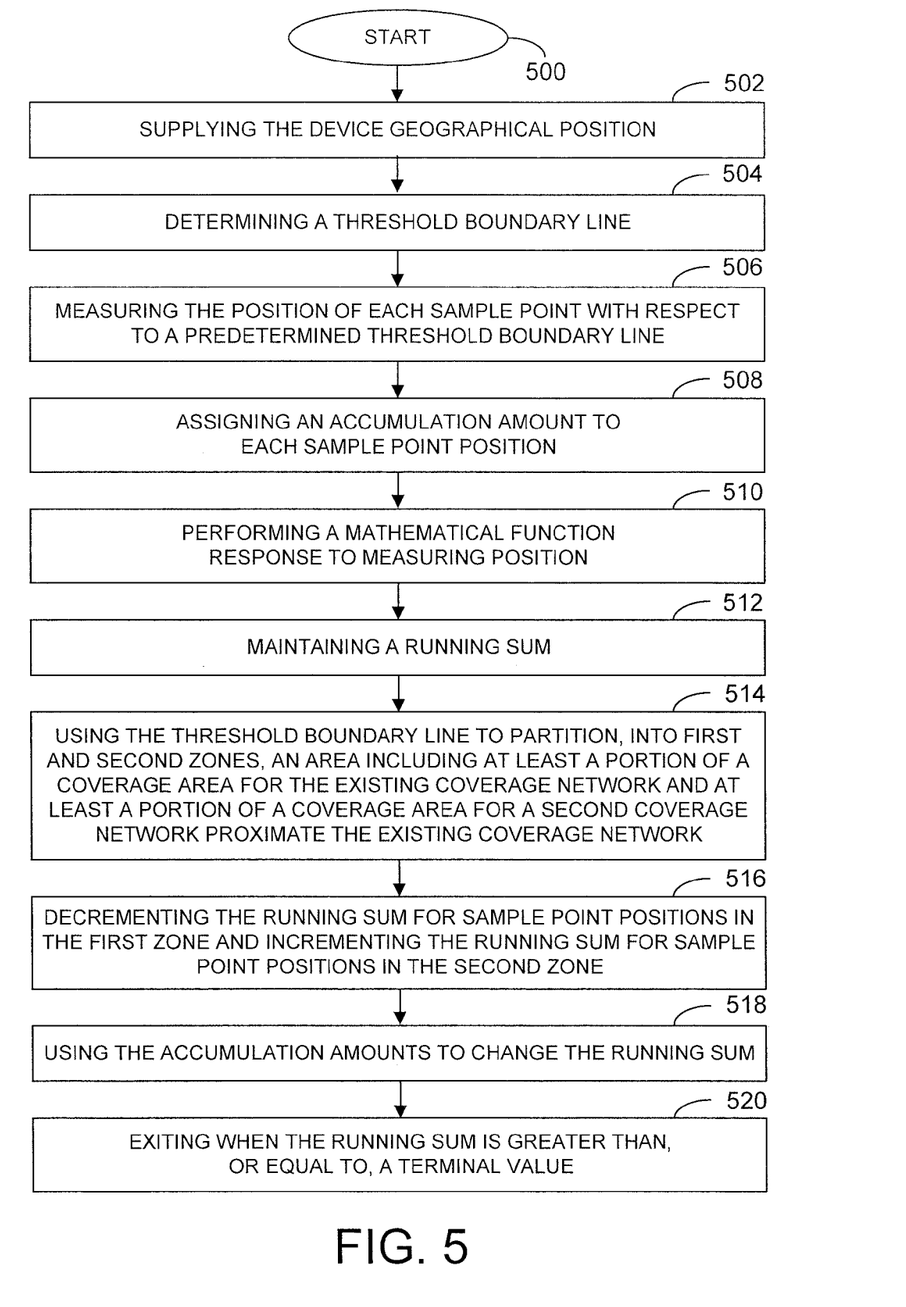
FIG. 5 is a flow chart further illustrating the method shown in FIG. 4.

FIG. 5 is a flow chart further illustrating the method shown in FIG. 4. The method starts with Step 500. Step 502 supplies the device geographical position. Step 504 determines a threshold boundary line. Step 506 measures the position of each sample point with respect to a predetermined threshold boundary line. Step 508 assigns an accumulation amount to each sample point position. Step 510 performs a mathematical function in response to measuring position. Step 512 maintains a running sum. Step 514 uses the threshold boundary line to partition, into first and second zones, an area including at least a portion of a coverage area for the existing coverage network and at least a portion of a coverage area for a second coverage network proximate the existing coverage network, the first zone proximate a first side of the threshold boundary line oriented toward the geographical center for the existing coverage network and the second zone proximate a second side of the threshold boundary line. Step 516 decrements the running sum for sample point positions in the first zone and increments the running sum for sample point positions in the second zone. Step 518 uses the accumulation amounts to change the running sum. Step 520 exits when the running sum is greater than, or equal to, a terminal value.

In some aspects, supplying the device geographical position in Step 502 includes periodically supplying the device geographical position. In some aspects, supplying the device geographical position in Step 502 includes the device assisting in calculating device geographical position. In some aspects, supplying the device geographical position in Step 502 includes the device receiving device geographical position from a source external to the device.

In some aspects, a Step 503 compiles information regarding coverage areas for a plurality of wireless communications coverage networks within, overlapping or proximate the existing wireless communications coverage network. Then, determining threshold boundary lines in Step 504 includes using the compiled information to determine threshold boundary lines between the existing coverage network and the plurality of coverage networks. In some aspects, compiling information regarding coverage areas for the plurality of wireless communications coverage networks in Step 503 includes compiling information for intermittently active coverage networks.

In some aspects, determining a threshold boundary line in Step 504 includes the device calculating threshold boundary lines or selecting threshold boundary lines from information available in the device. In some aspects, determining a threshold boundary line in Step 504 includes the device determining threshold boundary lines from information received from a source exterior to the device. In some aspects, determining a threshold boundary line in Step 504 includes forming a threshold boundary line using a plurality of vectors referenced to the geographical center of the existing coverage network. In some aspects, forming a threshold boundary line using a plurality of vectors includes using first and second vectors, to identify first and second geographical points, respectively and forming a straight-line threshold boundary line between the first and second geographical points. In some aspects, forming a threshold boundary line using a plurality of vectors includes using a third vector to identify a radius and forming a circular threshold boundary line using a length of the third vector as the length of the circle radius. In some aspects, forming a threshold boundary line using a plurality of vectors includes receiving vectors from a base station.

In some aspects, determining a threshold boundary line in Step 504 includes adapting the threshold boundary line to dynamic conditions in a coverage network cell. In some aspects, adapting the threshold boundary line to dynamic conditions in a coverage network cell includes adapting the threshold boundary line to dynamic conditions in a CDMA cell. In some aspects, adapting the threshold boundary line to dynamic conditions in a CDMA cell includes adapting the threshold boundary line to inter-cell and intra-cell interference.

In some aspects, measuring the position of each sample point with respect to a predetermined threshold boundary line in 506 includes measuring a first sample point position, in the first zone, a first perpendicular distance from a first point on the boundary line and measuring a second sample point position, in the second zone, a second perpendicular distance from the boundary line. Then, assigning an accumulation amount to each sample point position in Step 508 includes assigning a first accumulation amount to the first sample point position and a second accumulation amount to the second sample point position. Then, decrementing and incrementing the running sum for sample point positions in the first zone in Step 516 includes using the first accumulation amount to decrement the running sum and using the second accumulation amount to increment the running sum. In some aspects, the absolute value of the first accumulation amount equals the absolute value of the second accumulation amount. In some aspects, the first and second perpendicular distances are equal.

In some aspects, measuring the position of each sample point with respect to a predetermined threshold boundary line in Step 506 includes measuring, in the first zone, a first plurality of sample point positions with an initial sample point position a third perpendicular distance, greater than the first perpendicular distance, from the boundary line and with each successive position a greater perpendicular distance from the threshold boundary line than a preceding position. By this we mean the initial position in the first plurality is the closest position, in the first plurality, to the threshold boundary line and subsequent positions in the first plurality are increasingly distant from the threshold boundary line. In some aspects, measuring the position of each sample point with respect to a predetermined threshold boundary line in Step 506 includes measuring, in the second zone, a second plurality of sample point positions with an initial sample point position a fourth perpendicular distance, greater than the second perpendicular distance, from the boundary line and with each successive position a greater perpendicular distance from the boundary line than a preceding position. By this we mean the initial position in the second plurality is the closest position, in the second plurality, to the threshold boundary line and subsequent positions in the second plurality are increasingly distant from the threshold boundary line.

In some aspects, assigning an accumulation amount to each sample point position in Step 508 includes assigning a first plurality of successively larger accumulation amounts to respective positions in the first plurality of sample point positions, beginning with the initial sample point position. By this we mean the initial position in the first plurality is assigned the smallest accumulation value and each subsequent position in the first plurality is assigned an accumulation amount larger than that assigned to the position preceding the subsequent position. The value of an initial amount in the first plurality of accumulation values, corresponding to the initial position in the first plurality of sample point positions, is greater than the value of the first accumulation amount and a value of an initial amount in the second plurality of accumulation values, corresponding to the initial position in the second plurality of sample point positions, is greater than the value of the second accumulation amount. Then, assigning an accumulation amount to each sample point position in Step 508 includes assigning a second plurality of successively larger accumulation amounts to respective positions in the second plurality of sample point positions, beginning with the initial sample point position. By this we mean the initial position in the second plurality is assigned the smallest accumulation value and each subsequent position in the second plurality is assigned an accumulation amount larger than that assigned to the position preceding the subsequent position. Then, decrementing and incrementing the running sum for sample point positions in the first zone and second zones, respectively, in Step 514 includes using respective accumulation amounts in the first plurality of accumulation amounts to decrement the running sum and using respective accumulation amounts in the second plurality of accumulation amounts to decrement the running sum.

In some aspects, the absolute value of an accumulation amount in the first plurality of accumulation amounts equals the absolute value of a corresponding accumulation amount in the second plurality of accumulation amounts. For example, the same accumulation amount is assigned to the respective initial positions in the first and second plurality of positions. In some aspects, the perpendicular distance from the boundary line of a position in the first plurality of positions equals the perpendicular distance from the boundary line of a corresponding position in the second plurality of positions. For example, the respective initial positions in the first and second plurality of positions are equidistant from the threshold boundary line. Refer to the above discussion for FIGS. 1, 2, and 3a regarding weighting of positions with respect to the boundary line and assigning values to accumulation amounts.

In some aspects, decrementing the running sum in Step 516 includes decrementing the running sum if the running sum is greater than a predetermined minimum value.

In some aspects, exiting the existing coverage network when the running sum is greater than, or equal to the terminal value in Step 520 includes resetting the running sum to a predetermined initial value after exiting the existing coverage network.

In some aspects, exiting the existing coverage network in Step 520 includes entering a second coverage network and re-configuring the wireless device from an existing coverage network operating system processor to a second coverage network operating system processor. In some aspects, re-configuration is performed by downloading new software for the second system processor. In some aspects, re-configuration is performed by switching to new hardware for the second system processor within the wireless device.

A system and a method are provided for determining when to exit an existing wireless communications coverage network. Examples of the invention have been enabled with and without supplemental threshold boundary lines and with a plurality of device geographical positions with respect to a threshold boundary line. However, it should be understood that the present invention is not limited to any particular number of supplemental threshold boundary lines or device geographical positions. The system and method are applicable to a wide range of wireless communications device configurations, as well as to any other devices that use distance from a transceiving source or a relationship of distance and received energy levels in a decision making process. Other variations and embodiments of the present invention will occur to those skilled in the art.

Although the invention has been described with reference to particular embodiments, the description is only an example of the invention's application and should not be taken as a limitation. Consequently, various adaptations and combinations of features of the embodiments disclosed are within the scope of the invention as encompassed by the following claims.

We claim:

1. A method for determining when to exit an existing coverage network in a wireless communications device, the method comprising the steps of:
   determining a threshold boundary line;
   partitioning an area into a first zone and a second zone, the area including at least a portion of a first coverage area for the existing coverage network and at least a portion of a second coverage area for a second coverage network proximate the existing coverage network, the first zone proximate a first side of the threshold boundary line oriented toward a geographical center for the existing coverage network and the second zone proximate a second side of the threshold boundary line;
   compiling a history of geographical location data of the wireless communications device, comprising the steps of:
      supplying the wireless communications device a plurality of sample points comprising geographical positions of the wireless communications device;
      measuring a position of each sample point of the plurality of sample points with respect to the threshold boundary line; and,
      maintaining a running sum of the measured position of the each sample point, wherein maintaining the running sum comprises the steps of:
         decrementing the running sum for the measured position of the each sample point in the first zone; and,
         incrementing the running sum for the measured position of the each sample point in the second zone; and
      comparing the running sum to a terminal value; and
   exiting the existing coverage network based upon the compiled history of geographical location data.

2. The method of claim 1 wherein exiting the existing coverage network includes exiting when the running sum is greater than the terminal value.

3. The method of claim 1 wherein the step of measuring the position of the each sample point with respect to the threshold boundary line includes assigning an accumulation amount to the each sample point; and, wherein maintaining the running sum includes using the accumulation amount for the each sample point to decrement or increment the running sum.

4. The method of claim 1 wherein measuring the position of the each sample point with respect to the threshold boundary line includes:
measuring a first sample point position in the first zone at a first perpendicular distance from a point on the boundary line; and,
measuring a second sample point position in the second zone at a second perpendicular distance from the threshold boundary line;
assigning a first accumulation amount to the first sample point position and a second accumulation amount to the second sample point position;
wherein decrementing the running sum includes using the first accumulation amount to decrement the running sum; and,
wherein incrementing the running sum includes using the second accumulation amount to increment the running sum.

5. The method of claim 1 wherein the step of measuring the position of the each sample point with respect to the threshold boundary line includes:
measuring, in the first zone, a first plurality of sample point positions with an initial sample point position a first perpendicular distance from the threshold boundary line and with each successive position a greater perpendicular distance from the threshold boundary line than a preceding position; and,
measuring, in the second zone, a second plurality of sample point positions with a second initial sample point position a second perpendicular distance from the threshold boundary line and with each successive position a greater perpendicular distance from the threshold boundary line than a preceding position;
wherein assigning an accumulation amount to the each sample point position includes: assigning a first plurality of successively larger accumulation amounts to respective positions in the first plurality of sample point positions, beginning with the initial sample point position; and,
assigning a second plurality of successively larger accumulation amounts to respective positions in the second plurality of sample point positions, beginning with the second initial sample point position;
wherein decrementing the running sum includes using respective accumulation amounts in the first plurality of accumulation amounts to decrement the running sum; and,
wherein incrementing the running sum includes using respective accumulation amounts in the second plurality of accumulation amounts to decrement the running sum.

6. The method of claim 1 wherein the wireless communications device assists in determining device geographical position.

7. The method of claim 1 wherein the geographical positions are received from a source external to the wireless communications device.

8. The method of claim 1 wherein determining the threshold boundary line includes forming a threshold boundary line using a plurality of vectors referenced to a geographical center of the existing coverage network.

9. The method of claim 1 wherein determining the threshold boundary line includes adapting the threshold boundary line to dynamic conditions in a coverage network cell.

10. The method of claim 9 wherein adapting the threshold boundary line to dynamic conditions in a coverage network cell includes adapting to dynamic conditions in a Code Division Multiple Access (CDMA) cell.

11. The method of claim 1 further comprising the steps of:
compiling information regarding coverage areas for a plurality of wireless communications coverage networks within, overlapping, and proximate the existing wireless communications coverage network; and,
wherein the step of determining the threshold boundary line includes using the compiled information to determine threshold boundary lines between the existing coverage network and the plurality of coverage networks.

12. The method of claim 1 wherein the step of exiting the existing coverage network further comprises entering a second coverage network and re-configuring the wireless device from an existing coverage network operating system processor to a second coverage network operating system processor.

13. In a wireless communications device, a system for determining when to exit an existing wireless communications coverage network, the system comprising:
a locator having a locator output for outputting device geographical sample positions; and,
a calculator connected to the locator output, the calculator utilizing a history of the device geographical sample positions for supplying an exit control signal, the calculator comprising:
a comparison circuit connected to the locator output, the comparison circuit selecting a first threshold boundary line and measuring the difference between each device geographical sample position and the first threshold boundary line, the comparison circuit outputting a decrement control signal or an increment control signals in response to the measurement;
a counting circuit for receiving the decrement control signal or the increment control signal and for performing a mathematical function responsive to accepting the decrement and increment control signals and comparing a mathematical function result to a predetermined terminal value the counting circuit supplying the exit control signal in response to the comparison.

14. The system of claim 13 wherein the comparison circuit partitions, into first and second zones separated by the first threshold boundary line, an area including at least a portion of a coverage area for the existing coverage network and at least a portion of a coverage area for a second coverage network proximate the existing coverage network, the first zone proximate a first side of the first threshold boundary line oriented toward the geographical center for the existing coverage network and the second zone proximate a second side of the first threshold boundary line; and,
wherein the comparison circuit supplies a first decrement control signal in response to accepting a device geographical sample position in the first zone and the comparison circuit supplies a first increment control signal in response to accepting a device geographical sample position in the second zone.

15. The system of claim 14 wherein the counting circuit maintains a running total responsive to accepting the decrement and increment control signals and compares the running total to the predetermined terminal value.

16. The system of claim 15 wherein the counting circuit includes:
a subtracting circuit connected to the comparison circuit, the subtracting circuit outputting a decrement accumulation value in response to accepting the first decrement control signal; an adding circuit connected to the comparison circuit, the adding circuit outputting an increment accumulation value in response to accepting the first increment control signal; and,
a totalizer connected to the subtracting circuit and the adding circuit, the totalizer for supplying the exit control signal.

17. The system of claim 16 wherein the totalizer maintains the running total starting at a predetermined initial value, decrements the running total for each decrement accumulation value, increments the running total for each increment accumulation value, and compares the running total to the terminal value.

18. The system of claim 17 wherein the totalizer outputs the exit control signal when the running total is greater than, or equal to the terminal value, and resets the running total to the initial value after supplying the exit control signal.

19. The system of claim 13 further comprising:
a transceiver connected to the comparison circuit, wherein the first threshold boundary line information is received through an antenna port of the transceiver.

20. The system of claim 13 wherein the locator generates information regarding device geographical sample positions.

21. The system of claim 13 further comprising:
a transceiver having an antenna port, wherein the transceiver antenna port receives device geographical sample positions determined by a source external to the wireless communications device and supplies the device geographical sample positions to the calculator.

22. The system of claim 13 wherein the comparison circuit forms threshold boundary lines using a plurality of vectors referenced to a geographical center of the existing wireless communications coverage network.

23. The system of claim 13 further comprising:
a transceiver for receiving information regarding coverage areas for other wireless communications coverage networks within, overlapping, and proximate to the existing wireless communications coverage network, the transceiver for supplying the received coverage area information to the comparison circuit; and,
wherein the comparison circuit determines alternate threshold boundary lines between the existing coverage network and the other coverage networks in response to accepting the coverage area information.

24. The system of claim 13 further comprising:
a transceiver;
a digital integrated circuit (IC) operatively connected to the transceiver; and,
a reconfiguration sub-system connected to the calculator, the reconfiguration sub-system receiving the exit control signal from the calculator and supplying reconfiguration information in response to the exit control signal to the digital IC.

* * * * *